(12) United States Patent
Aschenbroich et al.

(10) Patent No.: US 9,343,927 B2
(45) Date of Patent: May 17, 2016

(54) METHOD OF CONTROLLING THE SUPPLY OF ELECTRICITY FROM A PUBLIC NETWORK FOR PUBLIC STREET LIGHTING

(75) Inventors: Marc Aschenbroich, Cestas (FR); Antoine Kassis, Paris (FR)

(73) Assignees: CITELUM, Paris (FR); WOODSYS SAS, Pessac (FR)

( * ) Notice: Subject to any disclaimer, the term of this patent is extended or adjusted under 35 U.S.C. 154(b) by 706 days.

(21) Appl. No.: 13/635,968

(22) PCT Filed: Mar. 23, 2011

(86) PCT No.: PCT/FR2011/050619
§ 371 (c)(1),
(2), (4) Date: Nov. 30, 2012

(87) PCT Pub. No.: WO2011/117541
PCT Pub. Date: Sep. 29, 2011

(65) Prior Publication Data
US 2013/0088093 A1    Apr. 11, 2013

(30) Foreign Application Priority Data

Mar. 23, 2010  (FR) ..................... 10 52097

(51) Int. Cl.
*H02J 3/14* (2006.01)
*H02J 13/00* (2006.01)
(Continued)

(52) U.S. Cl.
CPC .............. *H02J 13/00* (2013.01); *B60L 11/184* (2013.01); *B60L 11/1816* (2013.01); *B60L 11/1824* (2013.01); *B60L 11/1825* (2013.01); *B60L 11/1844* (2013.01); *B60L 11/1846* (2013.01); *B60L 11/1848* (2013.01); *G06Q 50/06* (2013.01); *G07F 15/005* (2013.01); *H05B 37/0272* (2013.01); *B60L 2230/40* (2013.01);
(Continued)

(58) Field of Classification Search
CPC .. B60L 11/1816; B60L 11/1825; G06Q 50/06
USPC ............................................ 307/38; 320/109
See application file for complete search history.

(56) References Cited

U.S. PATENT DOCUMENTS

| 2009/0287578 | A1 | 11/2009 | Paluszek et al. |
| 2010/0013436 | A1 | 1/2010 | Lowenthal et al. |
| 2010/0283426 | A1 | 11/2010 | Redmann |

FOREIGN PATENT DOCUMENTS

| DE | 93 07 580 U1 | 9/1994 |
| DE | 202007011309 U1 | 9/2008 |

(Continued)

OTHER PUBLICATIONS

International Search Report issued in International Patent Application No. PCT/FR2011/050619 dated Jan. 3, 2012.
(Continued)

*Primary Examiner* — Thienvu Tran
*Assistant Examiner* — Tien Mai
(74) *Attorney, Agent, or Firm* — Oliff PLC

(57) ABSTRACT

In the method of controlling a public lighting network for public street lighting, a member, such as a server uses a telecommunications network to send at least one command for switching a power supply circuit of an electricity outlet to an electricity source of the network. The outlet is accessible from the public street and from an outside portion of the device of the lighting network.

20 Claims, 2 Drawing Sheets

(51) Int. Cl.
  *B60L 11/18* (2006.01)
  *G06Q 50/06* (2012.01)
  *G07F 15/00* (2006.01)
  *H05B 37/02* (2006.01)
  *H02J 7/00* (2006.01)

(52) U.S. Cl.
  CPC ............... *H02J 7/0027* (2013.01); *Y02B 20/72* (2013.01); *Y02E 60/721* (2013.01); *Y02T 10/7005* (2013.01); *Y02T 10/7055* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y10T 307/74* (2015.04)

(56) References Cited

FOREIGN PATENT DOCUMENTS

| | | |
|---|---|---|
| DE | 102007038245 A1 | 3/2009 |
| FR | 2 750 807 A1 | 1/1998 |
| FR | 2 890 476 A1 | 3/2007 |

OTHER PUBLICATIONS

Written Opinion issued in International Patent Application No. PCT/FR2011/050619 dated Jan. 3, 2012.

METHOD OF CONTROLLING THE SUPPLY OF ELECTRICITY FROM A PUBLIC NETWORK FOR PUBLIC STREET LIGHTING

FIELD OF THE INVENTION

The invention relates to networks for public street lighting.

BACKGROUND OF THE INVENTION

Particular attention is being given at present to the industrial development of electric vehicles. For this purpose, a key element for determining the range of such vehicles and for encouraging their use lies in large-scale deployment of charging infrastructure.

In the present application, the term "electric vehicle" is used to designate any vehicle for travel on land or on water, that runs fully or in part on electrical energy, and that includes one or more electrical members that need to be recharged periodically. The vehicle may be a land vehicle having two or four wheels, such as a car, an electrically-assisted bicycle, or indeed a scooter. It may also be a boat. The vehicles may be private vehicles, utility vehicles, or public transport vehicles. Such a vehicle may be a hybrid vehicle having both an electric motor and a fuel-burning engine, or it may be an all-electric vehicle.

Charger devices may be installed in public or private areas accessible to such vehicles. Existing techniques include that of slow-charging terminals. That solution requires relatively low power and makes it possible to use various types of battery that present little memory effect and that are thus suitable for being subjected to successive short recharging operations without significantly shortening their lifetimes. The short distances traveled in a built-up area and the length of time spent parked mean that this type of charging is suitable for traveling in a built-up area.

It is known, e.g. from document FR 2 890 476, to make charging terminals available by the roadside.

Nevertheless, such a solution presents several drawbacks:
the cost of terminals in terms of investment and maintenance;
their vulnerability to acts of vandalism;
civil engineering costs and costs of connection to the electricity network;
the burdensome nature of procedures;
the long time required to implement the system;
little flexibility in installation;
the nuisance associated with major roadworks; and
overall carbon and energy balances of the investment that are uncertain or not very favorable.

OBJECT AND SUMMARY OF THE INVENTION

An object of the invention is to make it easier to use electric vehicles.

To this end, the invention provides a method of controlling a public lighting network for public street lighting, in which method a member, such as a server, uses a telecommunications network to send at least one command for switching a power supply circuit of an electrical outlet to an electricity source of the network, the outlet forming part of the lighting network and being accessible from the public street, in particular from an outside portion of a device of the lighting network, such as a lighting device.

Public lighting networks have a very large number of lighting points connected to the electricity distribution network, in particular via electrical cabinets that are already installed. Each of them forms one or more cable starting points, each powering several tens of lighting members. That infrastructure is thus dense and uniformly distributed in built-up areas and in particular in zones where vehicles are conventionally parked on the surface, and in traffic zones.

Furthermore, such networks are largely under-used, both in the daytime, when they are not powered, and at night when they are overdimensioned in order to be capable of powering lamps while they are lighting up, which time is nevertheless very short and restricted to predetermined times. It follows that the power available on the network is 100% in daytime and about 50% at nighttime except while lighting up the lamps. By way of example, this available power may amount to about 60 megawatts (MW) for a town having a population of two million, such as Paris.

The invention thus enables electric vehicles to be charged from a lighting network. A dense network of vehicle charging points is thus available both by day and by night, thereby making such vehicles easier to use and thus encouraging their use.

More precisely, in the context of the invention, electricity outlets from the lighting network are made available from the street and the power supply network is switched to select one of those outlets as a function of circumstances and vehicle charging needs, without this having any impact, a priori, on the lighting delivered by the network.

Although the outlet is accessible from the outside of the device, it can be protected from bad weather, dirt, and impacts, e.g. by means of a hinged hood.

Advantageously, the member identifies the outlet from a set of electricity outlets accessible from the public street and forming part of the lighting network.

The outlet may be fastened to a device that is itself fastened to the post of the lighting member.

The control member can thus determine the electricity outlet that is most suitable as a function of circumstances, in particular of the location of the vehicle that is a candidate for charging.

Preferably, the member uses the telecommunications network to send a command to cause the power supply circuit to be switched to the outlet.

Thus, whereas provision is made above for switching the power supply circuit of the electricity outlet to the electricity source, here it is a question of switching the power supply circuit to the outlet. The outlet is thus switched to the power supply network in two stages. For example, the first switching stage takes place before a user has requested vehicle charging, in preparation of such an event, while the second switching stage takes place after the request has been made.

Advantageously, the member uses the telecommunications network or another telecommunications network to send data relating to a location of the outlet.

The user is thus informed where to find the outlet that can be used for charging.

Advantageously, the device is a lighting device and the member sets a value of power to be made available at the outlet as a function of a predetermined power value allocated to lighting by the device.

Thus, in this implementation, the power allocated by the network to recharging one or more vehicles is adapted as a function of the power needed for lighting, in order to optimize lighting.

Provision may thus be made for the member to control a power value allocated to lighting by the device as a function of a predetermined value of power to be made available at the outlet.

Thus, in this implementation, the power allocated by the lighting network is adapted as a function of the power needed for charging the connected vehicle(s), in order to optimize the power available on the network.

Preferably, the outlet is a first outlet and the member uses the telecommunications network to send a command to cause the power supply circuit of a second electricity outlet available from the public street and belonging to the lighting network to be disconnected from the network electricity source.

By way of example, this switching operation takes place following the switching of power to the power supply circuit of the first outlet so as to avoid having too great a number of outlet power supply circuits connected to the network simultaneously.

Advantageously, the member determines an overall power value allocated to lighting by a set of lighting devices of the lighting network, and then as a function of said value determines an overall power value available at the outlet(s).

Account is thus taken of the energy devoted to lighting by the lighting network, or that is to be used for that purpose, in order to optimize the fraction of the residual energy that can be made available for charging vehicles.

Preferably, such determination takes place iteratively several times over during a period of less than twelve hours.

This is thus in particular a question of taking account of the beginning of electricity being delivered by the outlet or by one of the outlets and/or the end of such electricity delivery, where the beginning and the end of delivery take place between two implementations of the determination.

It is thus possible to update the power available at the outlets on the basis of the latest information relating to the connections and disconnections to which some of the outlets have been subjected, e.g. in order to charge a vehicle or to stop charging a vehicle.

The invention also provides a method of controlling a public lighting network for public street lighting, in which method a device of the network, such as a lighting device, responds to a command received from a telecommunications network, by switching an electricity source of the lighting network to a power supply circuit of an electricity outlet that is accessible from the public street and from an outside portion of the device.

The invention also provides a control member, such as a server, of a public lighting network for public street lighting, the member being suitable for using a telecommunications network to send at least one command for switching a power supply circuit of an electricity outlet forming part of the lighting network and accessible from the public street to an electricity source of the network, the outlet being accessible in particular from an outside portion of a device of the lighting network, such as a lighting device.

The invention also provides a public lighting network for public street lighting, which includes at least one control member of the invention.

The invention also provides a public lighting network for public street lighting, which network includes at least one device such as a lighting device, including:
- an electricity outlet accessible from the public street and from an outside portion of the device; and
- means controllable from a telecommunications network to cause a power supply circuit of the outlet to be switched to an electricity source of the network.

Preferably, for the or each device of the network, the lighting network includes at least one sensor suitable for detecting the presence of a vehicle at a predetermined space associated with the outlet.

It is thus possible to determine remotely whether that space is or is not occupied, in particular in order to determine whether or not such occupation is authorized, thereby enabling the network to be better managed for charging vehicles.

The invention also provides a computer program including code instructions suitable for controlling the execution of steps of a method of the invention when executed on a computer. The invention also provides a data recording medium including such a program in recorded form. Finally, the invention provides making such a program available on a telecommunications network for downloading.

BRIEF DESCRIPTION OF THE DRAWINGS

There follows a description of an embodiment of the invention given by way of non-limiting example and with reference to the accompanying drawings, in which.

MORE DETAILED DESCRIPTION

Figure 1:
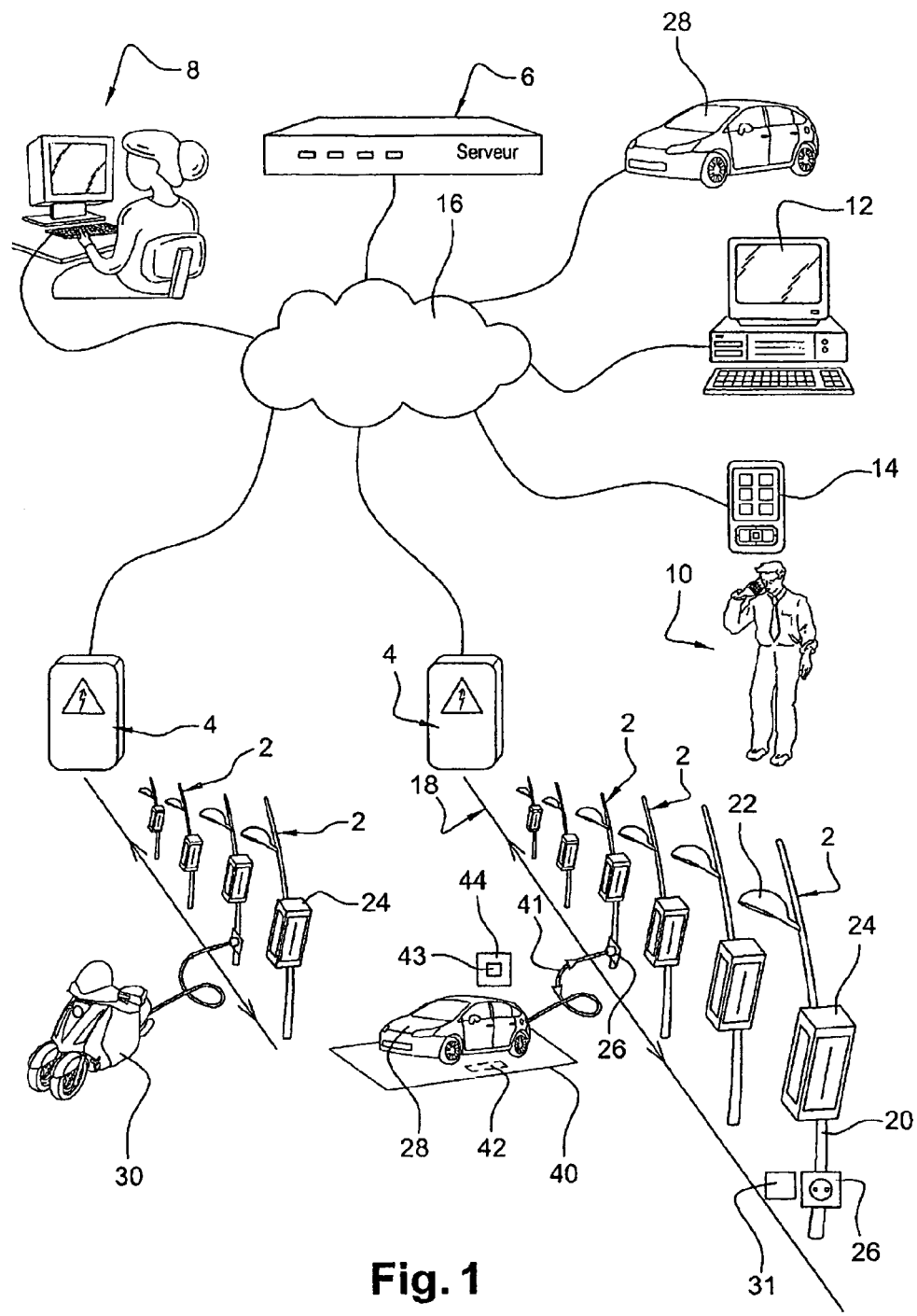
FIG. 1 shows the various elements of a system involved in implementing the method of the invention.

FIG. 1 shows various elements of a system involved in implementing the method of the invention. These elements, which are described in greater detail below, are summarized briefly as follows:
- lighting members 2 constituting lamp posts;
- electrical cabinets 4 feeding electrical power to the members 2;
- a controlling computer device such as a server 6;
- a workstation 8 for managing the elements of the system;
- communications means operating over a telecommunications network and usable by a user 10. By way of example, these means may comprise a computer 12 and a cell phone 14;
- a lighting network 18; and
- one or more telecommunications networks 16 enabling data and/or commands to be exchanged between these various elements. These networks may comprise in particular the Internet, one or more wired or wireless telephone networks, one or more electrical power supply networks, and the network 18.

The mobile telephone networks in question in this application may for example be of the 2G, 3G, or 3G+ type, or indeed they may form a satellite telephone network.

The network 18 is a public electricity network for providing public street lighting. It is not excluded that this network also contributes to lighting a private road or a private area. The network includes lighting members 2 that are connected as a group to an electrical cabinet 4. Each member 2 comprises a support or post 20 having a foot and a light unit 22 forming a lamp fastened to the support.

Each lighting member 2 specifically includes an electronic module 24, e.g. installed in the light unit or in the base of the support and controlling the electrical power delivered to the lamp to provide lighting. The module 24 serves in particular to control switching on the light unit at the beginning of the night and switching it off at the end of the night. Provision may be made for the module 24 to be suitable for determining the level of power to be delivered to the lamp depending on whether or not the outlet 26 is in use, so as to be able to increase the amount of power available for charging purposes. Thus, it is possible to increase the power available from the network for charging vehicles by modulating the power injected into the members 2 by means of the modules 24. This may be performed in various ways:

- either on the basis of preprogrammed scenarios (non-dynamic system). The module 24 is then given settings prior to being installed so as to implement a predefined power-variation scenario;
- or else in real time depending on the constraints applied to the system, so that the system becomes dynamic. The module may then be controlled in real time and remotely by the server 6 via the networks 16 and 18. By way of example, this communication may take place by means of power line carriers (PLCs), radiowaves, etc.

Each of the lighting members 2 includes at least one electrical outlet 26 that is accessible from an external portion of the member and from a public thoroughfare (e.g. from a road, a street, a roadway, or a sidewalk) in order to supply electricity. It is possible in this way to charge an electric vehicle 28 such as a car or a three-wheeled vehicle 30 such as a scooter. It suffices for this purpose to connect a storage battery of the vehicle by means of an electric cable 41 to the outlet 26. In such a configuration, the member 2 thus supplies electricity to the vehicle in order to charge its battery.

Specifically, each outlet 26 is fastened to the post of the member. Although it is necessary to modify the lighting member in order to install such an outlet therein, such modification does not require any roadworks nor does it require any connection to an electricity network. Such an outlet may be moved to another post, should that be required. Advantageously, the outlets 26 may have identified locations within the network 18, and each of them may have its own Internet protocol (IP) address specific thereto.

An outlet control module 31 is incorporated in the lighting member 2. This module is designed and connected so as to be capable of communicating with the server 6, the cabinet 4, and the vehicle 28, 30 during charging, and indirectly with the user 10. These communications may take place in various ways, in particular using power line carriers, radiowaves, or one or more mobile telephone networks.

Figure 2:
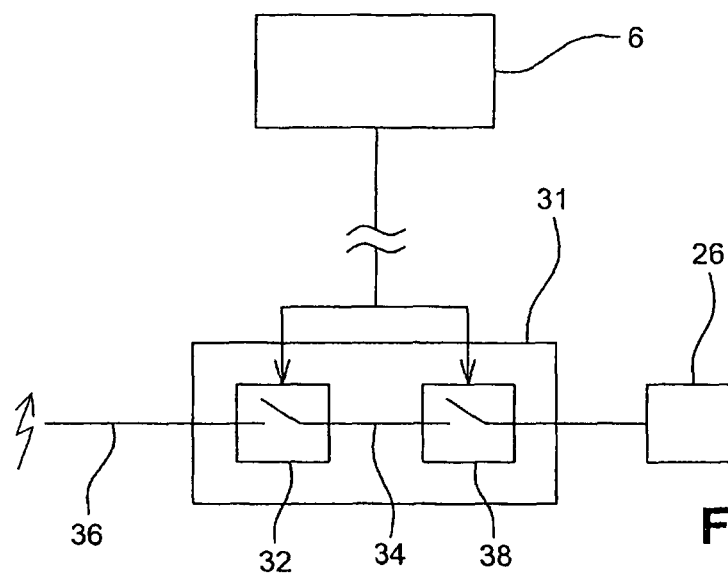
FIG. 2 is a diagram showing the principle on which an outlet is caused to be switched to the power supply network in the system of FIG. 1.

With reference to FIG. 2, the module 31 serves to act remotely to activate and deactivate the outlet 26, in particular as a function of the power available on the network or of the power to be made available on the network.

It includes a first switch 32 suitable for switching a power supply circuit 34 of the outlet 26 to the electrical power supply network 36 of the lighting network.

It also includes a second switch 38 suitable for switching the power supply circuit 34 to the outlet itself, this second switch being in series with the first and being interposed between the first switch and the outlet.

The two switches 32 and 38 are remotely controllable by the server 6 via any one of the telecommunications networks.

Thus, the server may send a command to the first switch 32 in order to switch the power supply circuit 34 to the network electricity supply 36.

It may also subsequently send a command to the second switch 38 for the purpose of switching the power supply circuit 34 to the outlet 26. The outlet is then powered and can be used for charging a vehicle.

The first switch 32 is operated prior to a user making a charging request, and as a function of various criteria which may be selected from the following:

- depending on whether the present time is daytime or nighttime;
- the power available on the lighting network;
- constraints imposed on the network;
- local management policies;
- the closeness of the outlet to a power supply cabinet 4, with outlets that are closer being switched on as a priority in order to reduce line losses;
- vehicle traffic and parking constraints; and
- previous history of how the method has been implemented by the system, thereby providing a training function.

The second switch 38 is controlled as the result of a charging request sent by a user 10 and received by the server 6. The request may be sent by means of the telephone 14 or by means of a contactless card or a card using contacts, or indeed by means of a communicating article such as a universal serial bus (USB) key, or possibly from the vehicle 28, 30 itself.

Each module 31 is provided with safety means such as a circuit breaker, which safety means could otherwise be incorporated in the outlet 26 or in some other portion of the member 2. A luminous signaling member may be provided for showing the state of the outlet (free, powered, unavailable, ... ). The module 31 may have a screen, but provision could also be made for information to be supplied directly to the user on the screen of the user's telephone 14 in order to avoid installing fragile devices at the roadside. Provision may also be made for the module 31 and the battery(ies) 44 of the vehicle to enter into communication via the outlet 26 and the power supply cable 41, in particular for the purpose of adapting charging.

Provision is made in the present embodiment for the module 31 to perform a telemetry function consisting in measuring or metering so as to account for electricity consumption by the outlet 26 while charging. This measurement is useful for billing the motorist 10 and for selecting an operator if such a selection is made available by legislation. The measurement taken is transmitted to the server 6 by appropriate means of the member 2 so that the server 6 can determine the number of kilowatts consumed during charging and can associate them with an electricity supply operator. Thus, the telemetry information obtained is sent to the server and may be used in certain circumstances as a basis for billing the user 10. By knowing how much energy has been consumed for charging the vehicle, the costs associated respectively with vehicle charging and with lighting can be distinguished, thus making it possible in particular for the user 10 to use an electricity supply operator who is not the same as the lighting network operator.

In a variant, the telemetry function is performed by the module 24 that meters energy consumption by the lamp 22 and that makes it possible, in comparison with the overall consumption of the members 2 as measured in the cabinet 4 powering those members, to determine the energy consumption of the outlet 26 when the outlet is being used for charging a vehicle.

In the present example, each lighting member 2 is associated with a roadside space 40 on which the vehicle can be parked while it is being charged. For each space 40, the network includes at least one sensor 42 suitable for detecting the presence of a vehicle on the space. The sensor may be installed on the surface of the road itself or may be buried underground. Provision may also be made to fasten it to the member 2. A sensor may be selected suitable for sensing the presence of a vehicle without making contact (e.g. using a magnetic or an electromagnetic mode, radio, laser, ultrasound, etc.). It may be a sensor that is independently powered using a photovoltaic panel or an electrical battery, or else it may be a sensor that is powered by the lighting network. Provision may be made for the present sensor also to be capable of identifying the vehicle by interacting with a device provided on board the vehicle for this purpose and permanently secured thereto. In a variant, the identification may be means associated with the user 10 and carried by the user 10.

The sensors 42 enable the server 6 to know whether the parking space reserved for charging is occupied or not, and possibly whether occupation is unauthorized or indeed whether the space is continuing to be occupied after the vehicle has finished charging. If occupation is unauthorized, the server may inform the management via the workstation 8. The sensor is suitable for transmitting information to the server concerning the time of arrival and time of departure of the vehicle. The member 2 sends information to the server about the time charging begins and the time it ends. These means enable the server to inform the user that charging has finished. The server may bill the user for parking in compliance with the regulations in force. Provision may be made for the parking space to be under the control of a device for preventing unauthorized occupation of that space. By means of all these possibilities, the management 8 can interrogate the server 6 to determine whether the vehicle 28 is indeed the vehicle that has requested a connection for charging purposes, can determine how long it is since charging terminated, should that be the case, etc.

The electricity connection cabinets 4 are fitted with means for telecommunication with the server 6, with the members 2, and in particular with their modules 31 and 34.

Using this system, in the method:
the server 6 calculates at all times the power available and identifies one or more outlets 26 from the set of electricity outlets of the lighting network;
the server sends over the telecommunications network 16 a command to switch the power supply circuit 34 of the or each identified outlet to the electricity source 36;
under the effect of this command, the first switch 32 of the member 2 in question switches the power supply circuit 34 to the electricity source 36;
the server receives data from a user 10 relating to a request to use the network, in particular for recharging a vehicle 28, 30;
the server determines a lighting member 2 of the network that has a usable outlet 26, i.e. an outlet for which the switch is already connecting the circuit 34 to the source 36;
the server sends a command over the telecommunications network to cause the power supply circuit 34 to be switched to the source 36;
as a result of this command, the second switch 38 of the member in question switches the power supply circuit 34 to the outlet 26, thereby powering the outlet;
the server sends data to the user 10 relating to the location of the outlet in question in the network; and
optionally, the server sends over the telecommunications network a command to disconnect the power supply circuit of at least one second electricity outlet of a member 2 from the network electricity source in order to limit the power available for charging vehicles.

Provision is made in this example for the user 10 to subscribe to the service enabling vehicles to be charged by various means available to the user, such as an on-line connection to the server 6 via the computer 12 or by means of the user's telephone 14. The user may select an electricity operator on this occasion or may perform this selection during the transaction for purchasing electricity.

The system is arranged in such a manner that when a user subscribing to the service is looking for an outlet for recharging a vehicle, the user makes a connection with the server 6 and the server guides the user to the nearest outlet 26 selected from those outlets that can supply electricity to the user. For this purpose, the server needs to take account of one or more of the following criteria:
the shortest distance between the user and the outlet;
the shortest travel time between them;
the route that consumes the least energy;
the most advantageous charging price;
travel policy in the zone in which the network is located; and
selecting a parking space for which there is the least loss of electricity in the network.

Once the user 10 has placed the vehicle 28, 30 on the space 40, the user calls the server 6, which identifies the user by means of the telephone number or by means of a code previously entered by the user via the keypad. The server is also informed by the sensor 42 that the vehicle is on the space. The user programs charging time and then validates the charging operation.

The telephone may be used for direct on-line payment, including for the parking. Various pricing rules may be applicable, including those that combine the cost of parking and special pricing if the space continues to be occupied after the vehicle has finished charging.

Once the request has been confirmed and payment made, the user connects the vehicle to the outlet 26 and charging of the vehicle begins, given that the server 6 has already powered the outlet.

Once charging has terminated, the user 10 is informed by telephone. Provision may be made for the telephone screen to display a virtual gauge.

Provision may also be made for the user 10 to transmit a certain amount of information to the server about the battery 44, such as the level of a battery gauge 43 or characteristics of the battery. This information enables the server to estimate the duration of the charging that is to be performed and also the profile of the power that is to be delivered as a function of time, or indeed to select as a function of that profile which outlet should be used for charging and which outlets should be made unavailable during charging. Provision may advantageously be made for each outlet 26 to be capable of delivering two non-zero power levels, on request.

At the end of charging, the user 10 is informed of the cost of charging and of the cost of parking before and after charging, in application of local policy.

The server 6 has functional subunits that interact with one another.

Thus, it has a subunit managing subscribers 10 to the system and a subunit managing payments.

It has a subunit that integrates the various content streams available and broadcasts those streams to applications on the telephone 14 of users. This subunit also manages making exchanges with mobile terminals secure, identifying those terminals, and authenticating both them and their positioning data.

The server has a subunit for controlling the modules 31.

The server 6 also has a subunit constituting a geographical information system for use in managing computer-assisted maintenance of the members 2 and in particular of their components giving rise to any increase in energy consumption.

It includes a subunit managing the beginning and the end of charging as a result of orders sent by users 10.

It has a subunit for managing telemetry and for distributing energy depending on the application.

It has a subunit for determining whether occupation of the parking spaces 40 is authorized or unauthorized.

The server also has a computer assembly that:

determines the locations of outlets 26 in application of various predefined criteria (travel plan, available parking spaces, state of traffic, . . . );

determines the number of outlets to be installed, manages recommendations for changing the locations of outlets as a result of training concerning conditions of use and by incorporating changes to travel plans or other constraints;

optimizes power availability by day and by night, giving priority to the street lighting service and modulating the power it uses depending on specified criteria;

manages a stage during which the light units are being switched on, a short stage at the beginning of the night during which no power is available for charging vehicles;

determines which outlets are available depending on the power available in each cabinet, taking account of outlets that are being used, outlets that are faulty, utilization scenarios, and regulates the system overall if there is too much demand for power;

alternates the availability of outlets depending on the expected occupation times as programmed by users, for example in the evening when residents can be expected to remain until a certain time. The outlets are then activated by the server in application of a program that optimizes the use of charging for a group of connected vehicles, by means of a queue-management function so that vehicles are fed with electricity in a certain order and not all at once;

manages guidance to available outlets in application of predetermined criteria; and manages charging tracking information sent to users.

The server 6 has a database of users and a database of network members, in particular of the cabinets 4 and of the lighting members 2.

In daytime, the lamps 22 are switched off so that 100% of the electrical power of the lighting network is available for charging vehicles. The system is configured so that, in daytime, i.e. during those times of the day when there is no street lighting, the network remains powered and the outlets 26 can deliver electricity without that requiring the lamps 22 to be switched on. Thereafter, the stage of switching the lamps on uses nearly 100% of the power available on the network, with this continuing for example for about fifteen minutes. Thereafter, during the night, lighting normally consumes about 50% of the total power available from the network, such that 50% of the power continues to be available for charging. The lighting network is therefore powered regardless of the time of day or night.

The elements of the system that perform a computer function, such as the server 6, the computers 12, the cabinets 4, the telephones 14, or the workstation 8 comprise conventional members such as microprocessors, memories, clocks, and means for receiving and transmitting data over the network 16.

The invention thus forms a method that manages the power available from a lighting network controlled in application of a given scenario, in order to enable electric vehicles to be charged. The method controls the network of outlets interactively by integrating the power called for by the outlets in an instantaneous and predictive mode.

The network 18 is powered and the power required for lighting purposes may itself be varied by the server 6 taking action on the modules 24, via the network 16.

In the invention, the server 6 calculates at all times the power left available by the lighting system for the purpose of powering the outlets, with these calculations being performed by analyzing the telemetry information and the measurement information as transmitted for example by the modules 24. It can thus be seen that the server is operating under constraints.

Depending on the power availability as calculated for each cabinet 4 forming a cable starting point 4, the server 6 connects power to the circuit 34 of one or more of the devices 31 connected to that starting point by controlling the corresponding switch(es) 32 over the network 16.

In one implementation, the number of devices 31 that are powered may be made greater than in other implementations by the server 6 acting via the modules 24 to reduce the power delivered to the lamps 22. This power reduction may be performed in application of a predefined scenario or in real time.

The server 6 decides which devices 31 are to have power connected to their circuits 34 in application of various setting criteria, including those mentioned above.

In general terms, an outlet 26 is powered by the server 6 activating the module 38 as a result of two or more consecutive events, such as:

1. A charging request sent by a user 10 by telephone 14 or by any other control means or via the workstation 8, in particular for maintenance and inspection purposes, the request being received by the server 6. The request may be sent by means of a card that is contactless or that makes use of contacts, or indeed by means of a communicating item such as a USB key, or indeed from the vehicle 28, 30 itself.

2. Charging authorization sent by the server 6 after verifying user access, payment, etc. conditions.

In certain configurations, the outlet 26 may be powered by the server 6 solely by activating the first switch 32, with the second switch 38 being continuously in its activated mode, or else with the switches 32 and 38 forming a single module in this configuration. This corresponds to a self-service utilization.

It is possible to provide for activation via the server 6 alone, in particular for maintenance or verification purposes.

When a car 28 is being charged, the amount of power it is drawing is sent over the network 16 to the server 6 by the telemetry or measurement function of the device 31. The server 6 calculates the available power, which varies depending on the power of the vehicle battery, and on its state of charge, and it powers devices 31 connected to the same starting point if power is still available in application of certain scenarios, or else it switches them off if not enough power is available. Switching off is performed by deactivating the switch 38 of a device 31. The server 6 may activate and deactivate outlets in order to give precedence to street lighting and in order to comply with urban management policy.

The server 6 may also modulate connecting and disconnecting a plurality of outlets connected to vehicles in order to increase the number of outlets in application of certain scenarios and plan charging over a long period, e.g. at night and in order to manage queues.

In the procedure for activating charging, the user of the vehicle 10 enters data relating to the vehicle and the level of charge of its battery 44 as specified by an energy gauge 43 thereof, the user making use of the telephone 14, or in other implementations of a key, a card, or a keypad of the device 31. Depending on the data that is returned via the network 16, the server 6 can calculate and predict the power that will be taken by the outlet and can regulate and predict more finely the available power by activating and deactivating other devices 31 connected to the same starting point. In one implementation, it is the recharging cable 41 that sends this data to the server 6 via the network 16.

In the method, all of the starting points are actuated in the same manner such that the server 6 has knowledge of all of the available devices 31 whether activated or not and connected to all of the starting points.

The starting points may be managed independently of one another in order to satisfy certain urban management constraints.

Likewise, by means of the sensors 42, the server 6 has knowledge of the occupation of the parking spaces corresponding to each of the outlets and can calculate utilization times, whether authorized or unauthorized. This knowledge available to the server 6 concerning the outlets 31 made available for charging by powering their circuits 34 enables a user 10 driving a vehicle to be informed by telephone 14 of the outlets that are available, after interrogating the server 6.

The characteristics of the vehicle (power, battery type) are known to the server 6 when a subscription is taken out and they are recognized by the call made using the telephone 14 or entered by the user 10, it being understood that the user can act in this way to communicate the level of energy available in the battery when the request is made, i.e. the reading of its energy gauge, and the server 6 can deduce the range available to the vehicle in terms of time or distance and inform the user of the nearest outlet 31 in application of various criteria (geographical distance, available energy, time) and having a corresponding parking space 40 that is available, which information is transmitted to the server 6 by the sensor 42, as described above.

In one implementation, provision may be made for the server 6, or a member to which it is connected, to calculate the total electrical power allocated to the lighting members for lighting and can deduce therefrom the overall level of electrical power available on the outlets for charging. For example, it may then determine:

the number of outlets having a predetermined nominal power that can be used for charging;

their locations in the lighting network; and the length of time each of those outlets can be used.

In order to determine available power, it is advantageous for the server to take account also of the power already being used for charging from the outlets and/or that is going to be used from them. To do this, the server may take account of vehicle charging forecasts that are transmitted thereto by the communications network, or it can itself make those forecasts on the basis of data available thereto. It takes account in particular of the length of time the outlets are expected to be used. If the length of time a connection may be made to an outlet is limited, in particular by regulations, e.g. to two hours, then the number of outlets that may be available and their locations may be affected thereby. Furthermore, if under such conditions a user desires charging to be limited to one hour, that also has an influence on the number of outlets that are available and on their locations.

Determining the power available for charging is preferably performed iteratively several times over during a period of less than twelve hours, and preferably of less than one hour. Account may thus be taken of the beginning of power being fed to an outlet or to one of the outlets for charging a vehicle, and/or of such power feed being switched off at the end of such charging, the beginning and the end of charging taking place between two occasions on which power availability determination is performed. The calculated overall power allocated to lighting and the calculated residual power available for vehicle charging are thus regularly updated in order to take account of users connecting and disconnecting vehicles.

Similarly, the server 6 may determine a timetable for putting outlets into operation. For example, vehicles that are connected thereto at the beginning of nighttime and that remain connected thereto all night may be charged in non-simultaneous manner, in particular they may be charged in alternation or sequentially. For example, certain vehicles may be charged at the beginning of the night, others in the middle of the night, and still others at the end of the night.

The outlets of the lighting network may have different nominal powers, e.g. 3 kilowatts (kW), 22 kW, etc.

All or some of the steps of the method of the invention may be controlled by means of a computer program stored within the above-mentioned elements and including code instructions suitable for performing that control. Provision may be made to record such a program on a data medium such as a compact disk (CD) or a digital video disk (DVD), a flash memory, or a hard disk. Provision may also be made to have the program available on a telecommunications network such as the network 16 in order for it to be downloaded to any of the above-mentioned elements.

The invention enables electrical charging to be performed from the lighting network. It takes advantage of the presence of this network and avoids the drawbacks of presently known solutions. It makes it possible to benefit from the residual power left available by the lighting members, both by day and by night other than while being switched on.

Figure 3:
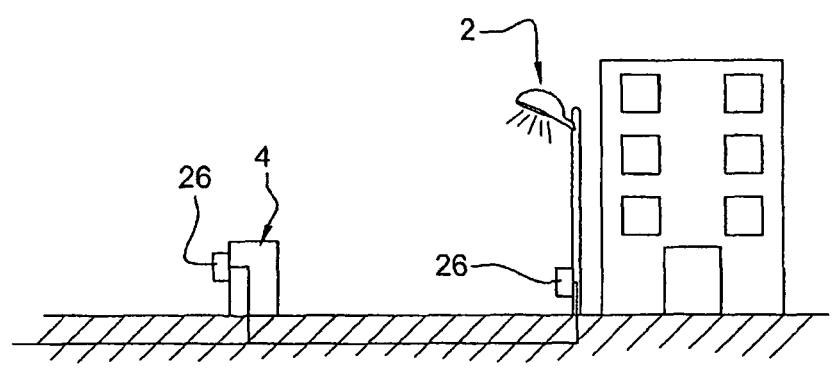
FIG. 3 is a view showing various locations for outlets.

Provision may be made for at least one outlet 26 of the lighting network not to be fastened to a lighting member 2. As shown in FIG. 3, such a member may for example be fastened to a wall of a building and need not have a support standing directly on the ground. The outlet 26 may then itself be fastened to the wall at a height making it accessible for charging. It may also be carried directly by the cabinet 4 connecting the member 2 to the network. Both possibilities may be used simultaneously, as shown. Under such circumstances, the or each outlet is connected to a junction box of the lighting network to which the member 2 is also connected, in parallel with the outlet.

Provision may be made for the module 24 to send information to the server 6 about the availability and the quality of the network, such as variation in reactive power, phase balancing, or monitored temperature.

The lighting network may be designed to feed electricity to kiosks and other street furniture elements such as taxi ranks, newsstands, bus stops, and public toilets.

Naturally, numerous modifications may be made to the invention without going beyond the ambit thereof.

What is claimed is:

1. A method of controlling a public lighting network for public street lighting, the public lighting network comprising a plurality of lighting devices each having a corresponding electrical outlet, each corresponding electrical outlet and having an outlet portion that is accessible from a public street and disposed on an outside portion of the corresponding lighting device, the method comprising:

determining, out of the plurality of electrical outlets, a subset of available electrical outlets to be supplied power; then sending, from a server via a telecommunications network, at least one first switching command instructing each electrical outlet of the subset to connect to an electricity source for supplying power to each subset electrical outlet; and then sending at least one second switching command instructing a first electrical outlet of the subset to provide power to the outlet portion;

wherein the first electrical outlet is configured to provide power to a vehicle charging device when the vehicle charging device is electrically connected to the outlet portion and power is provided to the outlet portion.

2. The method according to claim 1, wherein the step of determining a subset of available electrical outlets to be supplied power is performed by the server.

3. The method according to claim 1, further comprising the server sending, via the telecommunications network or another telecommunications network, data relating to a location of the first electrical outlet.

4. The method according to claim 1, further comprising the server setting a value of power to be made available at the first electrical outlet as a function of a predetermined power value allocated to lighting by the device.

5. The method according to claim 1, further comprising the server sending, via the telecommunications network, at least one third switching command instructing a second electrical outlet of the subset to disconnect from the electricity source.

6. The method of claim 1, wherein determining the subset of available electrical outlets includes considering one or more criteria selected from the group consisting of:
   whether the present time is daytime or nighttime;
   power available on the lighting network;
   constraints imposed on the lighting network;
   local management policies for the lighting network;
   a closeness value for each of the plurality of electrical outlets indicating the distance from each electrical outlet to a cabinet of the corresponding lighting device, wherein:
     electrical outlets at a short distance have a low closeness value;
     electrical outlets at a long distance have a high closeness value;
     closeness values are prioritized from low to high with low closeness values having a high priority and high closeness values having a low priority;
     high priority/low closeness value electrical outlets are selected over low priority/high closeness value electrical outlets for reducing losses in a corresponding power line for each electrical outlet;
   vehicle traffic;
   parking constraints; and
   previous history of switching for each of the plurality of electrical outlets.

7. The method according to claim 1, wherein determining the subset of available electrical outlets comprises:
   determining an overall lighting power value allocated to lighting a set of lighting devices of the lighting network, then
   determining, as a function of the overall lighting power value, an overall available power value that can be available for powering one or more of the plurality of electrical outlets; and then
   determining, as a function of the overall available power value, the subset of available electrical outlets.

8. The method according to claim 7, wherein the step of determining the subset of available electrical outlets is performed iteratively several times during a period of less than twelve hours.

9. The method according to claim 8, wherein the period of less than twelve hours includes a beginning of electricity being delivered to the subset of available electrical outlets in response to the step of sending the at least one first switching command.

10. The method according to claim 9, wherein the period of less than twelve hours further includes an end of the electricity being delivered to the subset of available electrical outlets.

11. The method according to claim 10, wherein the beginning and the end of the electricity being delivered takes place between two implementations of the step of determining the subset of available electrical outlets.

12. A method of controlling a public lighting network for public street lighting, the public lighting network comprising an electricity source and a plurality of lighting devices each having a corresponding electrical outlet, each electrical outlet having an outlet portion that is accessible from a public street and disposed on an outside portion of the corresponding lighting device, the method comprising:
   receiving, via a telecommunications network, at a first lighting device of the plurality of lighting devices, at least one first switching command instructing the electrical outlet corresponding to the first lighting device to connect to an electricity source for providing power; then
   switching the electrical outlet corresponding to the first lighting device to connect with the electricity source; then
   receiving, at the first lighting device, at least one second switching command instructing the electrical outlet corresponding to the first lighting device to provide power to the outlet portion; then
   switching the electrical outlet corresponding to the first lighting device to provide power to the outlet portion;
   wherein the electrical outlet corresponding to the first lighting device is configured to provide power to a vehicle charging device when the vehicle charging device is connected to the outlet portion and power is provided to the outlet portion.

13. The method according to claim 12, further comprising, in response to receiving at least one third switching command, disconnecting the first electrical outlet from the electricity source.

14. A server of a public lighting network for public street lighting, the public lighting network comprising a plurality of lighting devices each having an electrical outlet, each electrical outlet having an outlet portion that is accessible from a public street and disposed on an outside portion of the corresponding lighting device, the server being configured to:
   determine, out of the plurality of electrical outlets, a subset of available electrical outlets to be supplied power; then
   send, via a telecommunications network, at least one first switching command instructing each electrical outlet of the subset to connect to an electricity source for supplying power to the electrical outlet; and then
   send at least one second switching command instructing a first electrical outlet of the subset to provide power to the outlet portion;
   wherein the first electrical outlet is configured to provide power to a vehicle charging device when the vehicle charging device is electrically connected to the outlet portion and power is provided to the outlet portion.

15. A public lighting network for public street lighting, wherein the public lighting network includes at least one server according to claim 14.

16. The server according to claim 14, wherein the server is further configured to, in response to receiving at least one third switching command, disconnect the first electrical outlet from the electricity source.

17. The server according to claim 14, wherein determining the subset of available electrical outlets comprises:
   determining an overall lighting power value allocated to lighting by a set of lighting devices of the lighting network; then determining, as a function of the overall lighting power value, an overall available power value of power available for powering one or more of the plurality of electrical outlets; and then determining, as a function of the overall available power value, the subset of available electrical outlets.

18. The server of claim 14, wherein determining the subset of available electrical outlets includes considering one or more criteria selected from the group consisting of:
whether the present time is daytime or nighttime;
power available on the lighting network;
constraints imposed on the lighting network;
local management policies for the lighting network;
a closeness value for each of the plurality of electrical outlets indicating the distance from each electrical outlet to a cabinet of the corresponding lighting device, wherein:
electrical outlets at a short distance have a low closeness value;
electrical outlets at a long distance have a high closeness value;
closeness values are prioritized from low to high with low closeness values having a high priority and high closeness values having a low priority;
high priority/low closeness value electrical outlets are selected over low priority/high closeness value electrical outlets for reducing losses in a corresponding power line for each electrical outlet;
vehicle traffic;
parking constraints; and
previous history of switching each of the plurality of electrical outlets.

19. A public lighting network for public street lighting, wherein the public lighting network includes a plurality of lighting devices, each one of the lighting devices comprising:
an electrical outlet having an outlet portion that is accessible from a public street and disposed on an outside portion of the lighting device; and
a controller configured to communicate via a telecommunications network and cause a power supply circuit of the electrical outlet to be switched to connect with an electricity source of the network and perform actions comprising:
receiving, via a telecommunications network, at least one first switching command instructing the power supply circuit of the electrical outlet to connect to the electricity source; then
switching the power supply circuit of the electrical outlet to connect with the electricity source; then
receiving at least one second switching command for the electrical outlet to provide power to the outlet portion; and then
switching the electrical outlet to provide power to the outlet portion;
wherein the electrical outlet of each of the lighting devices is configured to provide power to a vehicle charging device when the vehicle charging device is electrically connected to the outlet portion and power is being provided to the outlet portion.

20. A network according to claim 19 that includes, for each one of the lighting devices, at least one sensor suitable for detecting the presence of a vehicle at a predetermined space associated with the electrical outlet.

* * * * *